United States Patent
Kauppi

(10) Patent No.: US 9,014,946 B2
(45) Date of Patent: Apr. 21, 2015

(54) PROGRAMMABLE GAUGE

(71) Applicant: Erik A Kauppi, Ann Arbor, MI (US)

(72) Inventor: Erik A Kauppi, Ann Arbor, MI (US)

( * ) Notice: Subject to any disclaimer, the term of this patent is extended or adjusted under 35 U.S.C. 154(b) by 332 days.

(21) Appl. No.: 13/668,227

(22) Filed: Nov. 3, 2012

(65) Prior Publication Data

US 2014/0129112 A1     May 8, 2014

(51) Int. Cl.
| | |
|---|---|
| *F02D 41/00* | (2006.01) |
| *F02D 29/02* | (2006.01) |
| *F02D 41/14* | (2006.01) |
| *F02M 25/028* | (2006.01) |
| *B60W 10/06* | (2006.01) |
| *F02D 41/26* | (2006.01) |

(52) U.S. Cl.
CPC ............... *F02D 41/00* (2013.01); *F02D 29/02* (2013.01); *F02D 2041/001* (2013.01); *B60W 10/06* (2013.01); *F02D 41/1446* (2013.01); *F02D 41/266* (2013.01); *F02D 41/0025* (2013.01); *F02D 2200/60* (2013.01); *F02M 25/028* (2013.01)

(58) Field of Classification Search
CPC ... F02D 41/00; F02D 2041/001; B60W 10/06
USPC ..... 701/101, 102, 115; 123/25 R, 25 A, 25 C, 123/25 Q, 198 A
See application file for complete search history.

(56) References Cited

U.S. PATENT DOCUMENTS

| | | | |
|---|---|---|---|
| 5,602,553 | A | 2/1997 | Polan |
| 6,560,528 | B1 * | 5/2003 | Gitlin et al. .................... 701/115 |
| 7,089,088 | B2 | 8/2006 | Terry |
| 2006/0001531 | A1 | 1/2006 | Waterman |
| 2006/0267749 | A1 | 11/2006 | Cheowth |
| 2007/0013494 | A1 | 1/2007 | Ochs et al. |
| 2007/0156321 | A1 | 7/2007 | Schad |
| 2007/0277775 | A1 * | 12/2007 | Orlosky ..................... 123/25 C |
| 2009/0066488 | A1 | 3/2009 | Qiahe |
| 2009/0138171 | A1 | 5/2009 | Marszalek |
| 2011/0137520 | A1 | 6/2011 | Rector |

\* cited by examiner

*Primary Examiner* — Mahmoud Gimie
(74) *Attorney, Agent, or Firm* — Diana D. Brehob

(57) ABSTRACT

A programmable gauge having a read out (gauge), a microcontroller, an input to microcontroller, and an infrared receiver is disclosed. A handheld infrared transmitter is used to communicate with the programmable gauge. In some embodiments, the programmable gauge further includes an output control signal. In a nonlimiting example, the input to the microcontroller is a temperature sensor and the infrared transmitter is used to select a set point. When the microcontroller senses a temperature above the set point, the microcontroller provides an output signal, for example, to turn on a fan.

20 Claims, 5 Drawing Sheets

PROGRAMMABLE GAUGE

FIELD

The present disclosure is related to a gauge with a microcontroller.

BACKGROUND

It is known in the art to have microcontrollers for all kinds of applications: automobiles, home heating systems, process controllers in plants, as just a few examples. In the field of racing, very sophisticated equipment is available for reading and analyzing data about various aspects of the operation of the vehicle and for sending control signals to various actuators on the vehicle. A laptop computer or tablet computer, for this purpose, is expensive and more involved than many users are interested in. Many microcontrollers are much more complicated than the control desire warrants. Furthermore, in some applications, it is desirable to provide a gauge on the vehicle, or other system being controlled, that is robust to water, dirt, vibration, and heat, at least. Buttons that may be provided onboard the gauge for calibration or controlling gains and/or set points may provide openings for water or dirt to enter.

SUMMARY

To overcome at least one problem in the prior art, an automotive control system is provided that has a programmable gauge which includes: a microcontroller, a gauge readout electronically coupled to the microcontroller, and an infrared receiver electronically coupled to the microcontroller. The automotive control system further includes an actuator electronically coupled to the microcontroller, a sensor electronically coupled to the microcontroller, and a calibrator having control buttons and an infrared transmitter. Actuation of control buttons on the calibrator emits a modulated infrared signal that is received by the infrared receiver to change a control parameter in the microcontroller.

The control parameter may be a set point, a gain, or other suitable parameter.

In one embodiment, the system further includes a vehicle having an internal combustion engine with an engine intake and an engine exhaust, a reservoir provided on the vehicle, a pump fluidly coupled to the reservoir, and a fluid injector disposed in the engine intake and fluidly coupled to an outlet of the pump.

The system may further comprise a sensor. The sensor can be a temperature sensor that is disposed in the engine exhaust, a knock sensor disposed on the engine, or a boost sensor disposed in the engine intake.

In one alternative, the injector is a water injector, the pump is a water pump, and the reservoir may is water reservoir. In another alternative, the injector is an alcohol injector, the pump is an alcohol pump, and the reservoir is an alcohol reservoir.

The control buttons of the calibrator are used to select one of several preprogrammed control strategies in the microcontroller. The preprogrammed control strategy choices include at least one of: set point control, proportional control, proportional-integral control, proportional-integral-derivative control, bistable control, hysteretic control, and programmable logic control.

In one alternative, the fluid injector is a water injector and the sensor is a thermocouple or a boost pressure sensor.

Also disclosed is a programmable gauge system, including: a calibrator having a wireless transmitter and control buttons electronically coupled to the wireless transmitter, and a programmable gauge. The gauge includes: a microcontroller electronically coupled to a gauge readout, an input connector, and a wireless receiver. Actuation of control buttons on the calibrator causes a modulated wireless signal to be transmitted from the wireless transmitter to the wireless receiver. The wireless transmitter may be one of an infrared transmitter, a radio frequency transmitter, a blue tooth transmitter, or any suitable transmitter with a receiver that is uses the same type signal, i.e., infrared, radio frequency, blue tooth, etc.

The system further includes an actuator electronically coupled to the programmable gauge and a sensor coupled to the input connector.

The programmable gauge is adapted to be mounted on a mobile apparatus and a face of the programmable gauge is resistant to water and dirt.

The microcontroller stores sensor data during normal operation. Then, in response to receiving a peak value signal from the calibrator, the microcontroller determines the peak value of the stored data and sends the peak value to the gauge readout to display the peak value. In response to receiving a playback signal from the calibrator, the microcontroller sends the stored data to the gauge readout for displaying playback of the stored sensor data.

An automotive control system is disclosed that has a programmable gauge with a digital readout, a microcontroller electronically coupled to the digital readout, an input of the microcontroller adapted to accept signal input from a sensor, and an infrared receiver. The system further includes a calibrator having control buttons and an infrared transmitter. The microcontroller has a plurality of preprogrammed operating strategies. Actuation of at least one of control buttons on the calibrator emits a modulated infrared signal that is received by the infrared receiver of the microcontroller thereby activating one of the preprogrammed operating strategies.

Further actuation of one control button changes a control parameter in the microcontroller and the control parameter is one of a set point and a gain.

The system further includes a vehicle, an actuator disposed on the vehicle and electronically coupled to the microcontroller, and a sensor disposed on the vehicle and electronically coupled to the input of the microcontroller. The microcontroller commands the actuator based on a signal from the sensor. The sensor provides a signal indicative of a temperature, a pressure, a speed, humidity, or position. The actuator is: a motor, a valve, a fan, or a pump.

One advantage of the programmable gauge disclosed is that the calibration buttons may remain remote from the gauge with the actuation of the buttons being transmitted to the programmable gauge through an infrared signal. As the controller may need infrequent calibration, it may desirable to have buttons associated with the calibration to be separate from the gauge to avoid inadvertent button pushes.

According to another advantage, the capability of the gauge is limited on purpose to make the device easy to setup and use. In many embodiments, the gauge is single purpose, such as controlling one actuator on a vehicle, such as an injector, in one nonlimiting example. In FIG. 1, an example of a vehicle 10 is shown. In FIG. 2, a dashboard 20 is shown that includes several gauges 22, rocker switches 24, knobs 26, and lights 26. It is in such a dashboard that the programmable gauge disclosed herein may be installed.

Yet another advantage is that the programmable gauge is inexpensive because it uses technologies that are well known and developed, however, in a novel arrangement.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
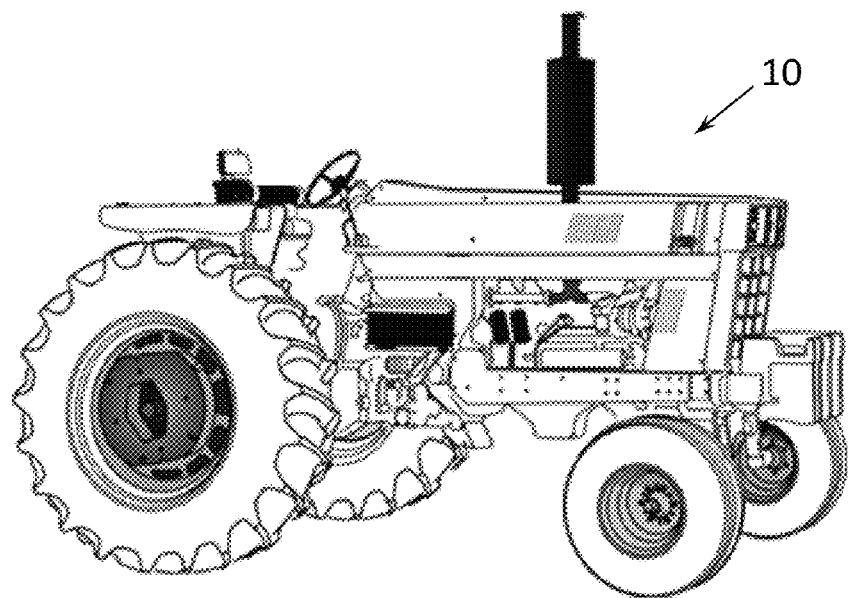
FIG. 1 is a line drawing of a tractor.
Figure 2:
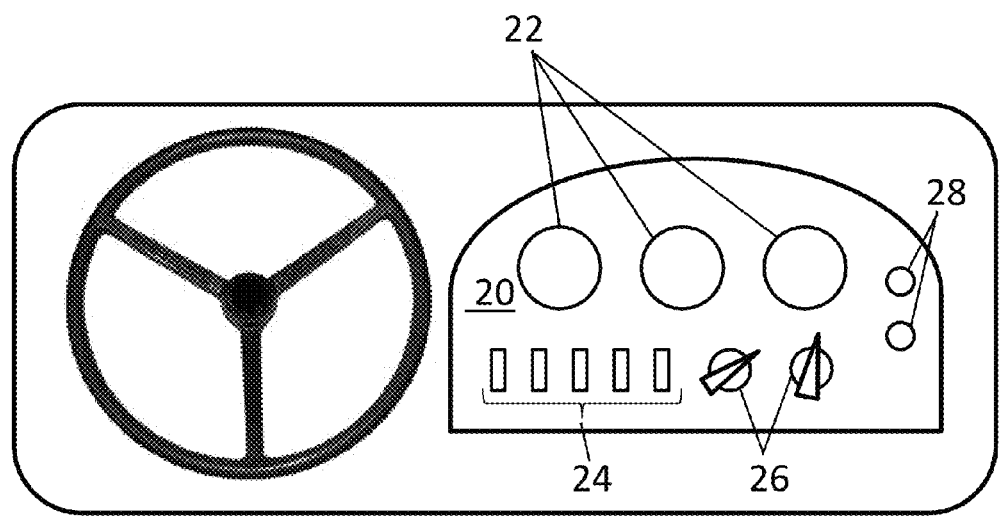
FIG. 2 is a line drawing of a dashboard.
Figure 3:
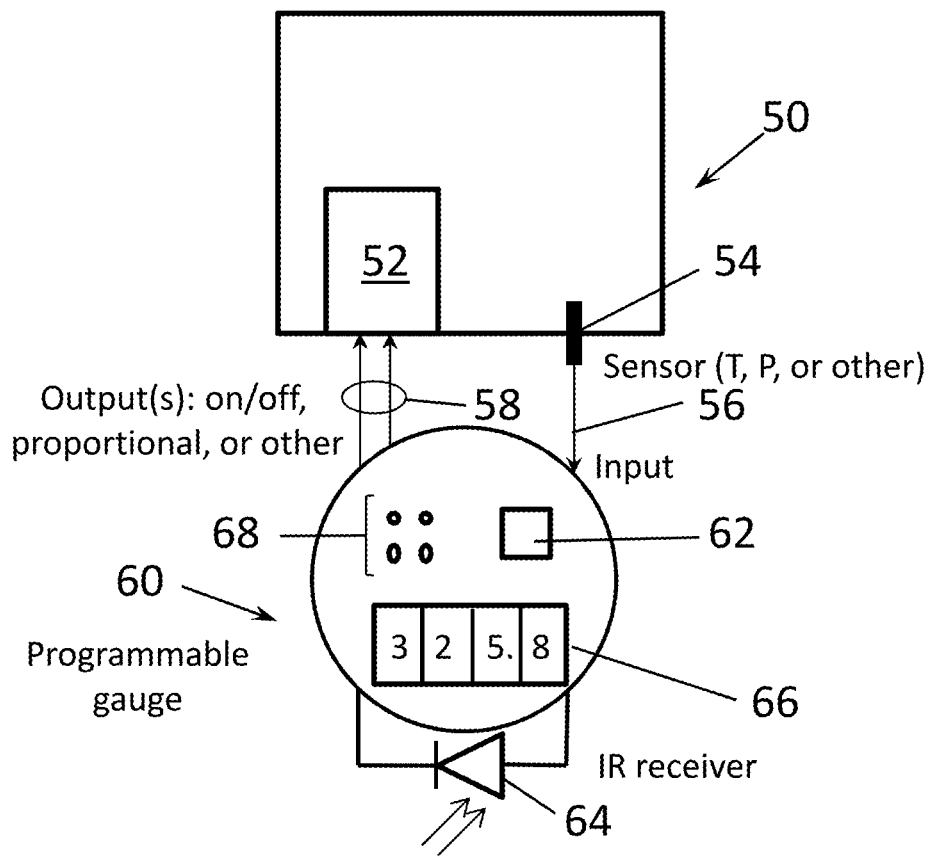
FIG. 3 is a block diagram of a programmable gauge and calibrator according to an embodiment of the disclosure.
Figure 3:
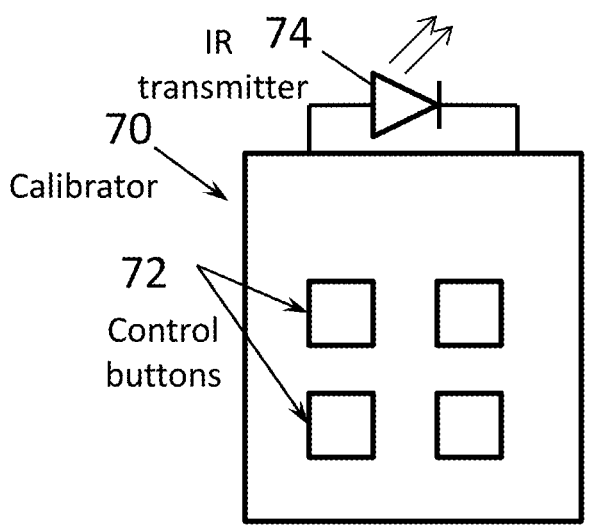

Referring to FIG. 3, an apparatus 50 that has at least one actuator 52 to be controlled is shown schematically. Apparatus 50 may be an automobile, tractor, robot, etc., and may be mobile or stationary. Actuator 52 may be an injection system, an oiling system, a pump, a heater, an ignitor, a switch, as nonlimiting examples. At least one sensor 54 is provided on apparatus 50. Sensor 54 may provide an electrical output indicative of temperature, pressure, humidity, speed, acceleration, force, position, etc. Actuator 52 receives control signals 58 from programmable gauge 60. Programmable gauge includes a microcontroller 62 that receives input from sensor 56, an outputs control signals 58. Microcontroller 62 includes, or is electronically coupled to, an IR receiver 64. Optionally, programmable gauge 62 may further include a digital display 66 (or alternatively analog) and indicator light(s) 68. Also included is a calibrator 70 that has an IR transmitter 74 and control buttons 72.

In one embodiment, microcontroller 62 is programmed with a desired control strategy, e.g., proportional control, on-off control, proportional-integral-derivative control, or any suitable strategy. The end user of the system uses calibrator 70 to set control parameters within microcontroller 62 using control buttons 72. Control parameters may include set points and gains. Calibrator 70 is not hard coupled to programmable gauge 60, but instead communicates wirelessly through IR signals.

Figure 4:
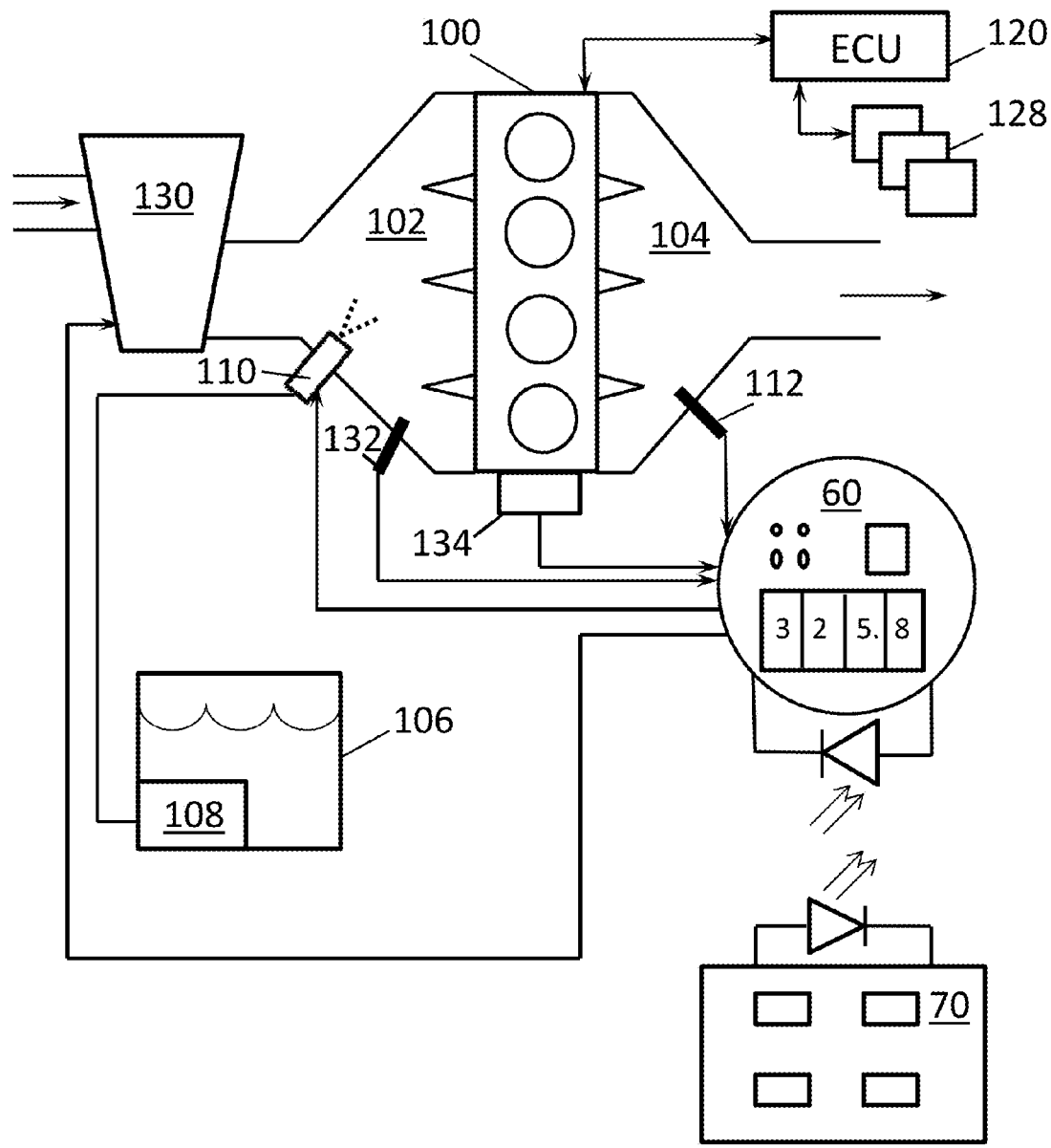
FIG. 4 is a block diagram of an internal combustion engine that has a programmable gauge for controlling an engine parameter.

Referring now to FIG. 4, an embodiment of the present disclosure is illustrated schematically in which an engine 100 of, for example, a tractor, has an intake manifold 102 and an exhaust manifold 104. A water tank 106 has a pump 108 disposed therein to provide pressurized water to injector 110. A thermocouple 112 disposed in exhaust manifold 104 provides an indication of exhaust temperature. Thermocouple 112 provides a signal to programmable gauge 60. Based on input from thermocouple 112, the control strategy programmed therein and calibration parameter previously set, programmable gauge 60 provides a control signal to injector 110.

In another example, nitrous oxide may be introduced in the intake. Tank 106, in this case is a pressurized cylinder or other reservoir and the nitrous oxide exits a valve as a gas (not as a liquid in the water or alcohol embodiment). Programmable gauge 60 can be used to meter the nitrous oxide.

In another embodiment, a compressor 130 is provided in the intake and can be controlled, such as by controlling a clutch between a drive coupled to engine 100 or by current provided to an electric motor (not shown) used to drive compressor 130. The control is based on boost pressure, as indicated by a pressure sensor 132.

According to another embodiment, a signal from an engine speed sensor 134 can be used in playback mode to analyze the speed at which transmission shifts occurred in a quarter-mile event.

In one nonlimiting example, the type of control is on-off control such that water injection is commanded only when the temperature in the exhaust exceeds a user selectable set point. The set point is, for example, a temperature just below that which would cause damage to the engine. By turning on water injection prior to attaining the temperature at which damage occurs, the cooling provided by water evaporation in the cylinder allows the engine to continue to increase power level without damage. In an alternative with proportional control, a set point temperature at which water injection starts is calibrated as well as a gain. The pulse width commanded to the injector, i.e., the amount of water injected, is proportional to the amount that the temperature in the exhaust exceeds the set point temperature.

Programmable gauge 60 is separate from the engine's primary control strategy. If the vehicle is provided with an electronic control unit (ECU) 130, sensors and actuators coupled to engine 100 as well as other sensors and actuators 128 are electronically coupled to ECU 130. In other embodiments of engine 110, no ECU is provided and mechanical controls are used, e.g., using a rack to control the amount of fuel injected in a diesel engine.

Figure 5:
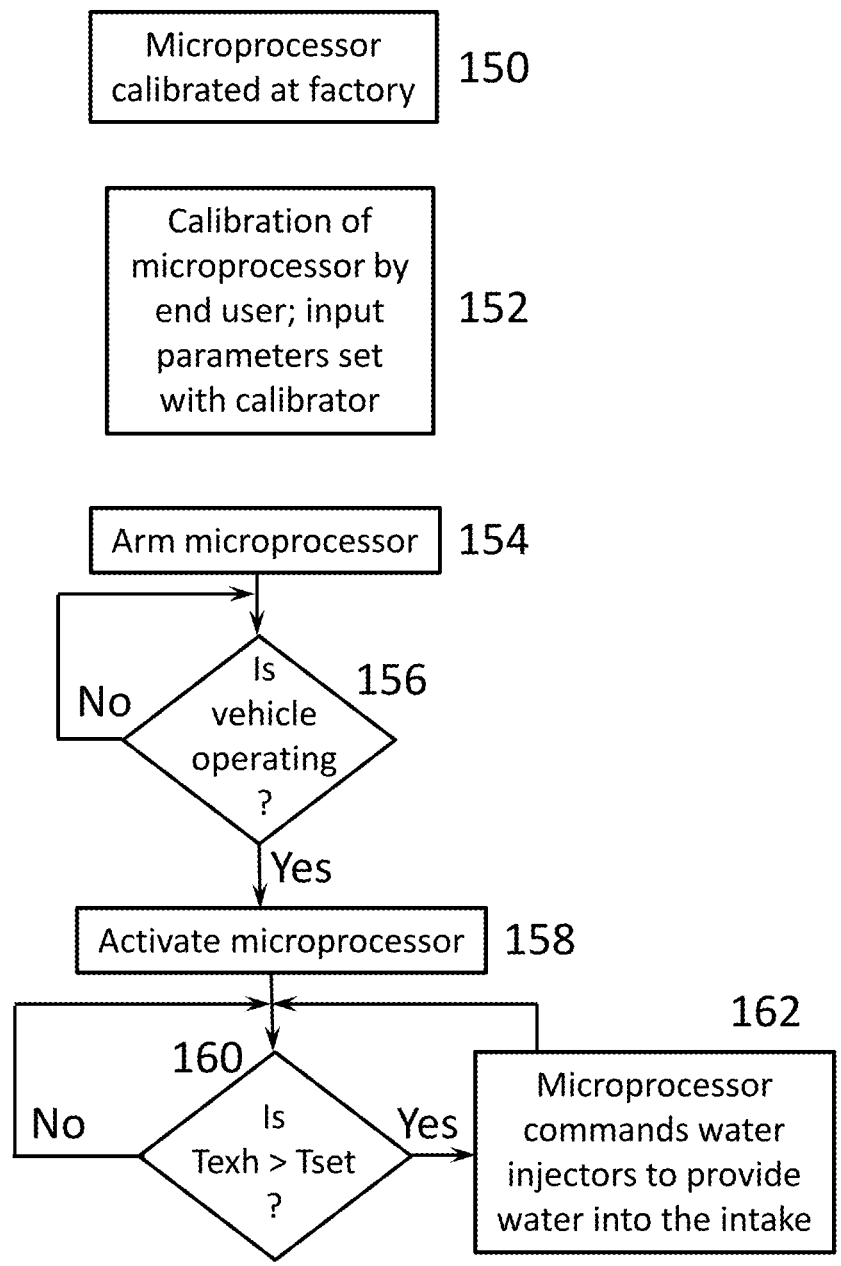
FIGS. 5 and 6 are flowcharts illustrating embodiments for invoking operation of the programmable gauge.

In FIG. 5, a flowchart illustrating an embodiment of processes employed in operating the gauge. In block 150, the microprocessor is programmed at the factory. This is based on the intended purpose of the programmable gauge. In block 152, the programmable gauge is calibrated by an end user. A type of control strategy, such as proportional control or on-off control, as two examples, is selected. Next, the appropriate set points are commanded using the calibrator.

The microprocessor is armed in block 154. In an embodiment in which the apparatus being controlled is a vehicle, it may be helpful to ensure that the microprocessor is deactivated when the vehicle is not operating. E.g., in the case of water injection, it is highly desirable to avoid filling up the engine intake with water in the event that a set point is incorrectly set up by the end user and/or a sensor providing input to the microcontroller malfunctions. In 156, it is determined whether the vehicle is operating. If so, the microprocessor is activated in block 158. In 160, temperature in the exhaust (as determined by the sensor) is compared with the set point temperature. If temperature in the exhaust exceeds the set point, control passes to block 162 in which the microprocessor commands the water to be injected. If the temperature in the exhaust is below the set point, block 160 is repeated until temperature requires a mitigating action to be taken. When the vehicle is deactivated, the microprocessor is automatically disarmed (not separately shown).

Block 150 and 152 are not shown as being directly connected with the rest of the blocks because blocks 150 and 152 are not performed during each instance of engine operation the way other blocks in FIG. 5 are performed. Block 150 is performed once (usually) prior to installation. Similarly, block 152 is not performed each time the engine is operated, but instead periodically when a new calibration is desired.

Figure 6:
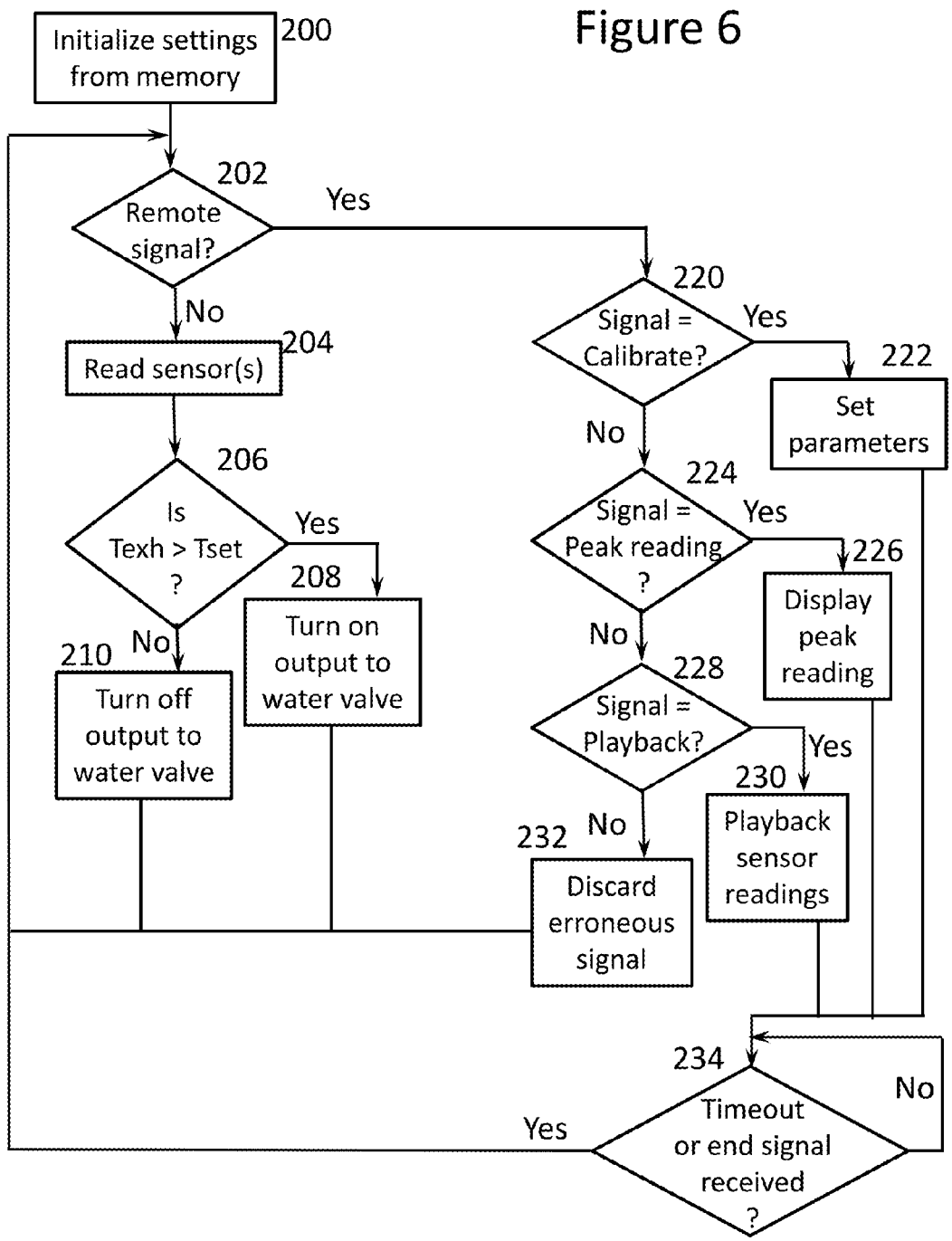

In FIG. 6, an alternative embodiment is shown in a flowchart. In block 200, settings are initialized from memory. In block 202, it is determined whether a remote signal is received. Alternatively, remote signal can be received as an interrupt. One embodiment of normal operation continues in block 204 in which the sensor or sensors are read. In block 206, the measured exhaust temperature is compared to a set point. Block 206 is just one example when the control is on exhaust temperature. Any other engine parameter, such as those listed above or others, may be evaluated in block 206. If a positive result in block 206, control passes to block 208 and water is turned on; or if a negative result, control passes to block 210 and water is turned off. Blocks 204, 206, 208, and 210 constitute one embodiment of normal control. If in block 202, a remote signal is received, it is evaluated in an if-then-else tree starting with block 220, in which it is determined whether the signal received indicates that a calibration should be performed. If so, control passes to block 222 for setting, or resetting, control parameters. If a negative result in 220, control passes to block 224 in which it is determined whether the signal is a request for a peak reading. If so, the peak reading is displayed on the gauge; if not, control passes to block 228, in which it is determined if the signal is a request for playback. If so, control passes to 230 to playback sensor readings. For example, if the engine sensor is a tachometer and the engine is performing a quarter mile, it may be desirable to determine the highest rpm that the engine was turning throughout the duration of the event. If a negative result in block 228, control passes to block 232 in which an erroneous signal is discarded. Blocks 222, 226, and 230 pass control to block 234 in which a timeout or end signal is received. If not, the system waits until a positive result in block 234. All of blocks 208, 210, 232, and 234 return control to block 202.

According to an advantage of the present disclosure, various processes can be performed by a remote command and without a computer or other expensive/overly-sophisticated electronic device, i.e., overly-sophisticated compared to the task at hand. Three nonlimiting example processes are illustrated in FIG. 6: calibration, peak reading, and playback.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. An automotive control system, comprising:
   a vehicle;
   a programmable gauge physically coupled to a dashboard of the vehicle including: a microcontroller, a gauge readout electronically and physically coupled to the microcontroller, and an infrared receiver electronically coupled to the microcontroller with the infrared receiver physically coupled to the programmable gauge;
   an actuator electronically coupled to the microcontroller;
   a sensor electronically coupled to the microcontroller; and
   a calibrator having control buttons and an infrared transmitter wherein actuation of control buttons on the calibrator emits a modulated infrared signal that is received by the infrared receiver thereby changing a control parameter in the microcontroller.

2. The system of claim 1, wherein the control parameter comprises one of: a set point and a gain.

3. The system of claim 1, further comprising:
   an internal combustion engine having an engine intake and an engine exhaust, the engine being disposed in the vehicle;
   a reservoir provided on the vehicle;
   a pump fluidly coupled to the reservoir; and
   a fluid injector disposed in the engine intake and fluidly coupled to an outlet of the pump.

4. The system of claim 1, further comprising: a sensor that is one of a temperature sensor that is disposed in the engine exhaust, a knock sensor disposed on the engine, and a boost sensor disposed in the engine intake.

5. The system of claim 4 wherein the injector is a water injector, the pump is a water pump, and the reservoir is a water reservoir.

6. The system of claim 4 wherein the injector is an alcohol injector, the pump is an alcohol pump, and the reservoir is an alcohol reservoir.

7. The system of claim 1 wherein the control buttons of the calibrator are used to select one of several preprogrammed control strategies in the microcontroller.

8. The system of claim 7 wherein the preprogrammed control strategy choices includes at least one of: set point control, proportional control, proportional-integral control, proportional-integral-derivative control, bistable control, hysteretic control, and programmable logic control.

9. The system of claim 1 wherein a face of the programmable gauge is resistant to water and dirt.

10. The system of claim 1 wherein the fluid injector is a water injector and the sensor is one of a thermocouple and a boost pressure sensor.

11. A programmable gauge system, comprising:
   a calibrator having a wireless transmitter and control buttons electronically coupled to the wireless transmitter;
   a programmable gauge including:
      a panel;
      a gauge readout mounted on the panel;
      a microcontroller electronically and physically coupled to the gauge readout and mounted on the panel;
      an input connector; and
      a wireless receiver mounted on the panel wherein actuation of control buttons on the calibrator causes a modulated wireless signal to be transmitted from the wireless transmitter to the wireless receiver.

12. The system of claim 11, further comprising: an actuator electronically coupled to the programmable gauge.

13. The system of claim 11 wherein the programmable gauge is adapted to be mounted on a dashboard of a mobile apparatus and a face of the programmable gauge is resistant to water and dirt.

14. The system of claim 11, further comprising: a sensor coupled to the input connector.

15. The system of claim 11 wherein the microcontroller stores sensor data during normal operation, and in response to receiving a peak value signal from the calibrator, the microcontroller determines the peak value of the stored data and sends the peak value to the gauge readout to display the peak value.

16. The system of claim 11 wherein the microcontroller stores sensor data during normal operation, and in response to receiving a playback signal from the calibrator, the microcontroller sends the stored data to the gauge readout for displaying playback of the stored sensor data.

17. An automotive apparatus, comprising:
a vehicle;
a programmable gauge mounted on a dashboard of the vehicle, the programmable gauge including: a digital readout, a microcontroller physically coupled to the programmable gauge and electronically coupled to the digital readout, an input of the microcontroller adapted to accept signal input from a sensor, and an infrared receiver physically coupled to the programmable gauge and electronically coupled to the microcontroller; and
a calibrator having control buttons and an infrared transmitter wherein the microcontroller has a plurality of preprogrammed operating strategies; actuation of at least one of the control buttons on the calibrator emits a modulated infrared signal that is received by the infrared receiver of the microcontroller thereby activating one of the preprogrammed operating strategies.

18. The system of claim 17 wherein further actuation of the at least one control buttons changes a control parameter in the microcontroller and the control parameter is one of a set point and a gain.

19. The system of claim 17, further comprising:
an actuator disposed on the vehicle and electronically coupled to the microcontroller; and
a sensor disposed on the vehicle and electronically coupled to the input of the microcontroller wherein the microcontroller commands the actuator based on a signal from the sensor.

20. The system of claim 19 wherein the sensor provides a signal indicative of one of a temperature, a pressure, a speed, humidity, and position; and the actuator is one of: a motor, a valve, a fan, and a pump.

* * * * *